March 21, 1950 — M. GATES — 2,501,325
BRASSIÈRE
Filed Aug. 15, 1947 — 2 Sheets-Sheet 1
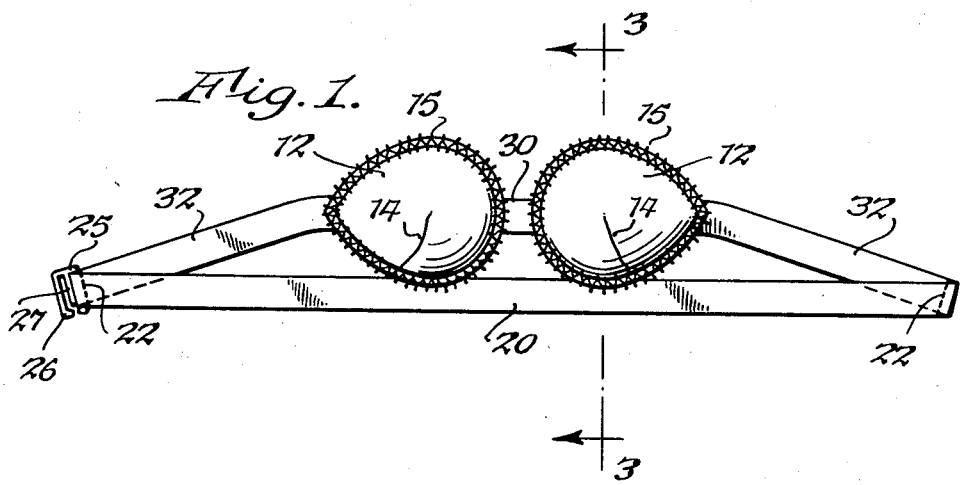
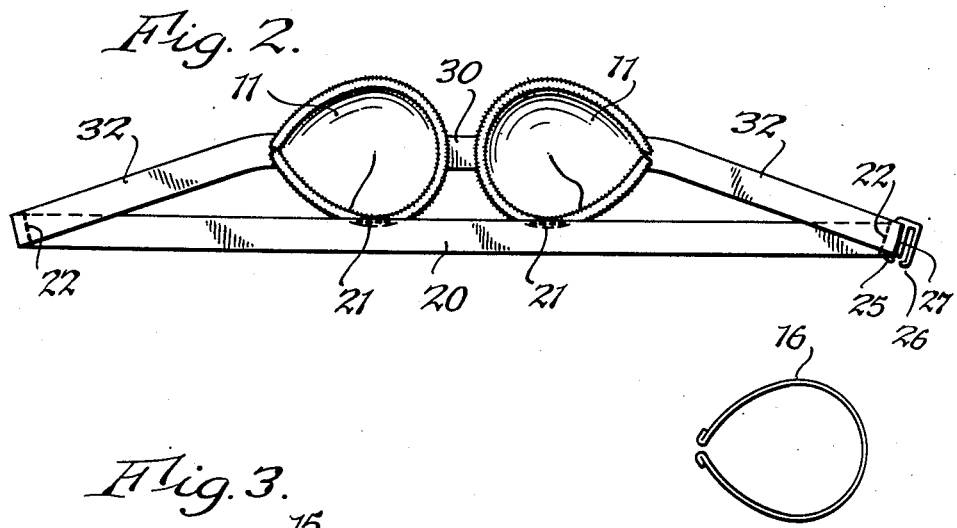
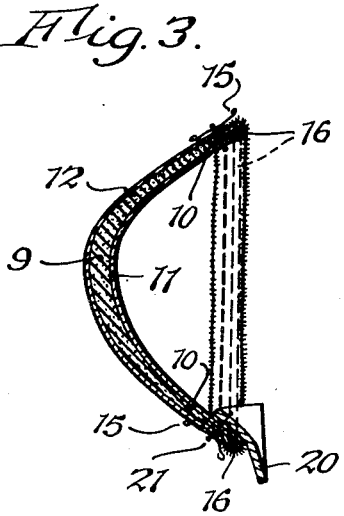
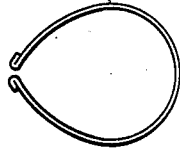
INVENTOR.
Miriam Gates
BY Parker, Crichton & Farmer
Attorneys.

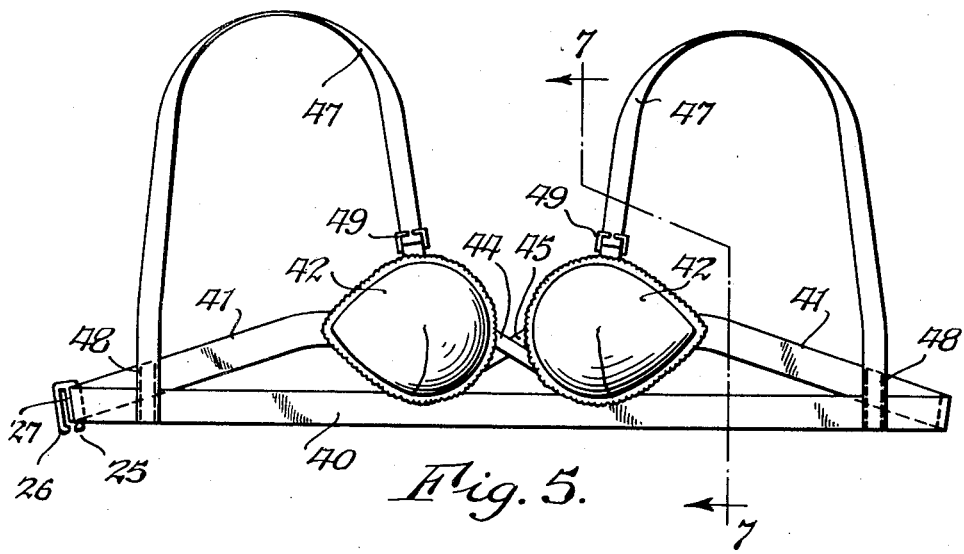
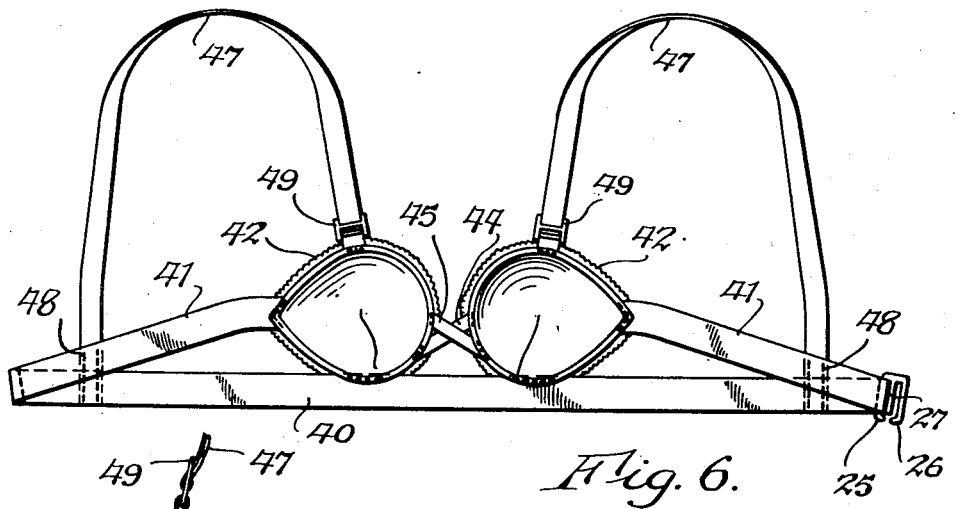
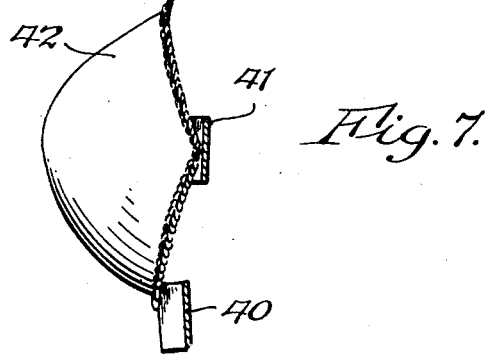

Patented Mar. 21, 1950

2,501,325

UNITED STATES PATENT OFFICE 2,501,325

BRASSIÈRE

Miriam Gates, Buffalo, N. Y.

Application August 15, 1947, Serial No. 768,847

2 Claims. (Cl. 2—42)

This invention relates to brassières and more particularly to brassières having bust pads included as parts thereof.

One of the objects of this invention is to provide a brassière of this type in which the bust pads are securely held in place with the maximum comfort to the wearer. Another object is to provide brassières in which the bust pads are supported in such a manner as to best simulate natural breasts. A further object is to provide a brassière including the minimum number of straps for the purpose of avoiding discomfort to the wearer in warm weather. A further object is to provide brassières of this type which are usable with strapless gowns or garments. Other objects and advantages of this invention will appear from the following description and claims.

In the accompanying drawings:

Fig. 1 is a front view of a brassière embodying this invention.

Fig. 2 is a rear face view thereof.

Fig. 3 is a sectional elevation thereof, on an enlarged scale, on line 3—3, Fig. 1.

Fig. 4 is a view of a reinforcing member used in connection with bust pads of the type employed in the brassière shown in Figs. 1 to 3.

Fig. 5 is a front view of a brassière of modified construction.

Fig. 6 is a rear view thereof.

Fig. 7 is a sectional view thereof, taken approximately on line 7—7, Fig. 5.

Bust pads used in connection with my improved brassière may be of any suitable or desired construction. Preferably these bust pads include a main body portion 9 formed of foam rubber or latex or other suitable material formed into shapes simulating the breasts. This may be accomplished in any suitable manner, either by molding the body portions into the desired shapes or by forming them of flat pieces of foam rubber or latex with one or more approximately sector-shaped pieces cut from the same and having the cut edges secured together in any suitable manner. The edge portions may be beveled or reduced in thickness as shown at 10 to enable the pads to better fit the body. The body portion 9 preferably has an inner liner 11, and an outer cover 12, both of which may be of any suitable or desired textile material. The outer cover is preferably also formed of a flat sheet of material with one or more approximately sector-shaped pieces cut out of the same and seamed together at the cut edges at 14, Fig. 1, in such a manner that the textile material will conform snugly to the exterior of the body portion 10, and the inner liner may be similarly formed. Any suitable decorative trimmings or edging material 15 may, if desired, be sewn around the outer edges of the bust pad.

In the particular construction of the bust pads shown in Figs. 1 to 3, suitable rigid or partly rigid reinforcing or stiffening members 16 may be arranged around the edge portions of the pads, and are preferably sewn into the lining for the purpose of enabling these pads to retain their intended shapes when incorporated in a brassière. These reinforcing or stiffening members 16 may be formed of wire pieces bent into substantially closed loop form as shown in Fig. 4, and when arranged in the pads, the ends of the wire members are preferably arranged at the outer sides of the bust pads. Plastic material may be used in place of metal wire, if desired.

In order to hold these bust pads in correct positions on the body of the wearer, I employ a main strap or tape 20 preferably made of a suitable elastic material and of sufficient length to extend around the body of the wearer. This main strap extends substantially tangentially to the lower edges of the bust pads and is stitched or otherwise secured thereto, for example, by means of sewing 21, Fig. 2. Loops are formed in the ends of the main strap 20 in any suitable manner, for example, by folding over a portion of the main strap and sewing the turned over portion to the main strap, indicated by the stitching 22. Any suitable means may be employed for connecting the loop portions of the main strap, for example, by means of a rigid connecting member including a pair of parallel arms 25 and 26 and an intermediate tongue portion 27 extending between the arms. One arm of the connecting member is passed through one of the loops and the other arm through the other loop, when the two ends of the main strap are connected to each other. Fastening means of any other suitable or desired type may be employed.

In addition to the main strap 20, the two bust pads are also connected to each other at approximately the portions thereof approaching closest to each other by means of a short strap or straps 30, the strap shown in Figs. 1 and 2 being secured to the adjacent edge portions of the bust pads approximately midway of their height. This strap 30 may be made either of elastic or of non-stretchable material.

The outer extremities of the sides of the bust pads also have straps 32 sewn or otherwise secured thereto, these straps preferably terminating at the open ends of the reinforcing members 18, and these straps are connected with the main strap 20 at or near the ends thereof to which the fastening devices are attached. These branch straps, consequently, are inclined downwardly from the opposite sides of the pads at a small or very acute angle to the main straps. Preferably, the branch straps 32 are continuations of the main straps 20, and this may be effected by folding over the main straps to form the branch straps and the sewing or stitching 22 in spaced relation to the folds forms the loops to which the fastening devices are secured.

The arrangement of the straps described results in a construction by means of which the bust pads will be securely held in place in the proper positions on the body and will be supported in such a manner that the brassière may be worn with the maximum of comfort. By use of the reinforcing loops 16, it will be noted that none of the straps is secured to the upper portions of the bust pads, so that a brassière of the type shown in Figs. 1 to 3 may be worn with strapless gowns, bathing suits or other garments having no straps extending over the shoulders of the wearer. The main strap 20, being secured to the lower edge portions of the bust pads, supports these pads well above the strap, and the branch straps 32 serve to hold the upper portions of the bust pads in contact with the body of the wearer.

In the modified construction shown in Figs. 5 to 7, the brassière is substantially similar in construction to that described in connection with Figs. 1 to 7, except that the reinforcing loop members 16 are omitted from the bust pads, and consequently, other means are provided for supporting the upper portions of the bust pads in their correct positions. In these figures, 40 represents the main strap or band and 41 the branch straps which also form continuations of the main strap. 42 represents the bust pads which do not have the reinforcing loop members in the edge portions thereof. These bust pads are also connected at their adjacent portions, a pair of straps 44 and 45 being shown in the construction illustrated. The upper edge portions of the bust pads are connected to shoulder straps 47, the other ends of the shoulder straps being sewn or secured to the main straps or the branch straps or to both by means of stitching 48, and suitable buckles 49 are provided for adjusting the length of the shoulder straps to suit the wearer. The brassière shown in Figs. 5 to 7 has the same advantages as the one described in Figs. 1 to 4, except that it cannot be worn with strapless gowns or garments. The main and branch straps 40 and 41 support the lower halves of the bust pads in correct positions on the wearer and the shoulder straps support the upper portions of the bust pads and also prevent the bust pads from being deformed by the pull of the branch straps 41, which deformation in the construction shown in Figs. 1 to 4 is prevented by means of the wire reinforcing members 16.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. In a brassière including a pair of bust pads, that improvement in the supporting means for holding said pads in correct positions on the body of a wearer, which includes a main elastic strap formed to extend around the body of the wearer above the waist, said strap extending substantially tangent to and being secured to the lower edges of said pads, means for releasably connecting the ends of said strap for attaching the brassière to the body of a wearer, connecting means extending between and secured at their ends to adjacent parts of said pads substantially midway of their vertical dimensions, branch elastic straps each secured at one end to the outer portions of said bust pads approximately midway of their vertical dimensions and secured at their other ends to said main strap adjacent to said releasable connecting means of said strap, and relatively rigid substantially loop-shaped members secured to the edge portions of said bust pads for holding said bust pads against deformation due to the pull of said branch straps.

2. In a brassière of the type worn without shoulder straps and including a pair of bust pads of readily yieldable material, that improvement in the supporting means for holding said pads spaced apart and in correct positions on the body of a wearer, which includes relatively rigid loop members extending at least partly about said pads at the outer edge portions thereof and secured thereto, an elastic band formed to extend about the body of the wearer above the waist and immediately below the breasts and which is operatively connected to said loop members at the lower edges of said bust pads, the elasticity of said band serving to hold said brassière against slipping on the body of the wearer to hold said loop members in correct positions on the body and said loop members supporting the upper portions of said bust pads against drooping downwardly, and connecting means connecting the adjacent portions of said pads to limit separation of the same.

MIRIAM GATES.

REFERENCES CITED

The following references are of record in the file of this patent:

UNITED STATES PATENTS

| Number | Name | Date |
|---|---|---|
| 1,250,875 | Heuchan | Dec. 18, 1917 |
| 1,290,608 | Lowman | Jan. 7, 1919 |
| 1,884,243 | Richards | Oct. 25, 1932 |
| 1,994,359 | Greenbaum | Mar. 12, 1935 |
| 2,131,457 | Tachat | Sept. 27, 1938 |